United States Patent
Elazar et al.

(10) Patent No.: US 7,305,082 B2
(45) Date of Patent: *Dec. 4, 2007

(54) METHOD AND APPARATUS FOR QUALITY ASSURANCE IN A MULTIMEDIA COMMUNICATIONS ENVIRONMENT

(75) Inventors: Avishai Elazar, Ra'anana (IL); Ilan Freedman, Petach-Tikva (IL)

(73) Assignee: Nice Systems Ltd., Raanana (IL)

( * ) Notice: Subject to any disclaimer, the term of this patent is extended or adjusted under 35 U.S.C. 154(b) by 338 days.

This patent is subject to a terminal disclaimer.

(21) Appl. No.: 10/275,896

(22) PCT Filed: May 8, 2001

(86) PCT No.: PCT/IL01/00406

§ 371 (c)(1),
(2), (4) Date: May 12, 2003

(87) PCT Pub. No.: WO01/86924

PCT Pub. Date: Nov. 15, 2001

(65) Prior Publication Data

US 2003/0169856 A1     Sep. 11, 2003

Related U.S. Application Data

(60) Provisional application No. 60/202,977, filed on May 9, 2000.

(51) Int. Cl.
*H04M 5/04* (2006.01)

(52) U.S. Cl. .............................. 379/265.07; 379/88.17; 707/2; 709/223

(58) Field of Classification Search ................. 379/68, 379/85, 88.12, 88.13, 88.14, 88.17, 88.22, 379/88.23, 265.09, 265.07; 709/223; 707/2
See application file for complete search history.

(56) References Cited

U.S. PATENT DOCUMENTS

| | | | |
|---|---|---|---|
| 5,530,740 A * | 6/1996 | Irribarren et al. | 379/88.17 |
| 5,533,103 A | 7/1996 | Peavey et al. | |
| 5,563,805 A | 10/1996 | Arbuckle et al. | |
| 5,619,508 A | 4/1997 | Davis et al. | |
| 5,819,005 A | 10/1998 | Daly et al. | |
| 5,867,559 A | 2/1999 | Jorgensen et al. | |
| 5,884,032 A | 3/1999 | Bateman et al. | |
| 5,946,375 A | 8/1999 | Pattison et al. | |
| 5,982,857 A | 11/1999 | Brady | |
| 6,031,895 A * | 2/2000 | Cohn et al. | 379/88.13 |
| 6,044,368 A * | 3/2000 | Powers | 707/2 |
| 6,122,348 A * | 9/2000 | French-St. George et al. | 379/88.23 |
| 6,222,909 B1 * | 4/2001 | Qua et al. | 379/88.22 |
| 6,230,197 B1 * | 5/2001 | Beck et al. | 709/223 |
| 6,542,602 B1 | 4/2003 | Elazar | |
| 6,771,765 B1 * | 8/2004 | Crowther et al. | 379/265.09 |
| 2003/0048883 A1 * | 3/2003 | Warren et al. | 379/88.17 |

* cited by examiner

*Primary Examiner*—Gerald Gauthier
(74) *Attorney, Agent, or Firm*—Pearl Cohen Zedek Latzer, LLP (57) ABSTRACT

The present invention relates to a method and system for monitoring and evaluating multimedia telephonic and computer-communication interactions. The multimedia quality monitoring system may include an event manager, which may receive a notification associated with a communication between an agent and a customer and recording servers, which record data associated with the communication.

15 Claims, 7 Drawing Sheets

METHOD AND APPARATUS FOR QUALITY ASSURANCE IN A MULTIMEDIA COMMUNICATIONS ENVIRONMENT

CROSS-REFERENCE TO RELATED APPLICATIONS

This application is a national phase application of International PCT Patent Application No. PCT/IL01/00406, filed May 8, 2001, which claims priority from U.S. Provisional Patent Application No. 60/202,977, filed May 9, 2000.

BACKGROUND OF THE INVENTION

Quality monitoring systems are increasingly being used at contact centers to monitor the effectiveness of the interactions of agents with customers. Existing quality monitoring systems are mainly directed to telephone call centers; however, they provide only a partial solution to quality assurance (QA) in multimedia contact centers.

Advanced telephone call monitoring systems enable the recording of an audio portion of the telephone call while synchronously recording at least a portion of the agent's interactions with a computer during the telephone call. The monitoring system receives notifications regarding the start and end of the call from a single server. It may be an automatic call distribution (ACD) server or a computer telephony integration (CTI) server. Such a system is described in U.S. patent application Ser. No. 09/503,479, filed Feb. 14, 2000, now U.S. Pat. No. 6,542,602 issued on Apr. 1, 2003, and assigned to the common assignee of the present application.

However, multimedia contact centers may require different solutions. In order to allow a supervisor to make a full QA assessment of an agent, the multimedia monitoring system may receive data from additional servers that handle the e-mail, chat or web collaboration The supervisor may be interested in reviewing, for example, both the e-mail text and the screen capture during answering in order to evaluate the way the agent uses his computer.

Accordingly, existing QA monitoring systems may not provide satisfactory solutions for QA in multimedia contact centers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Figure 1:
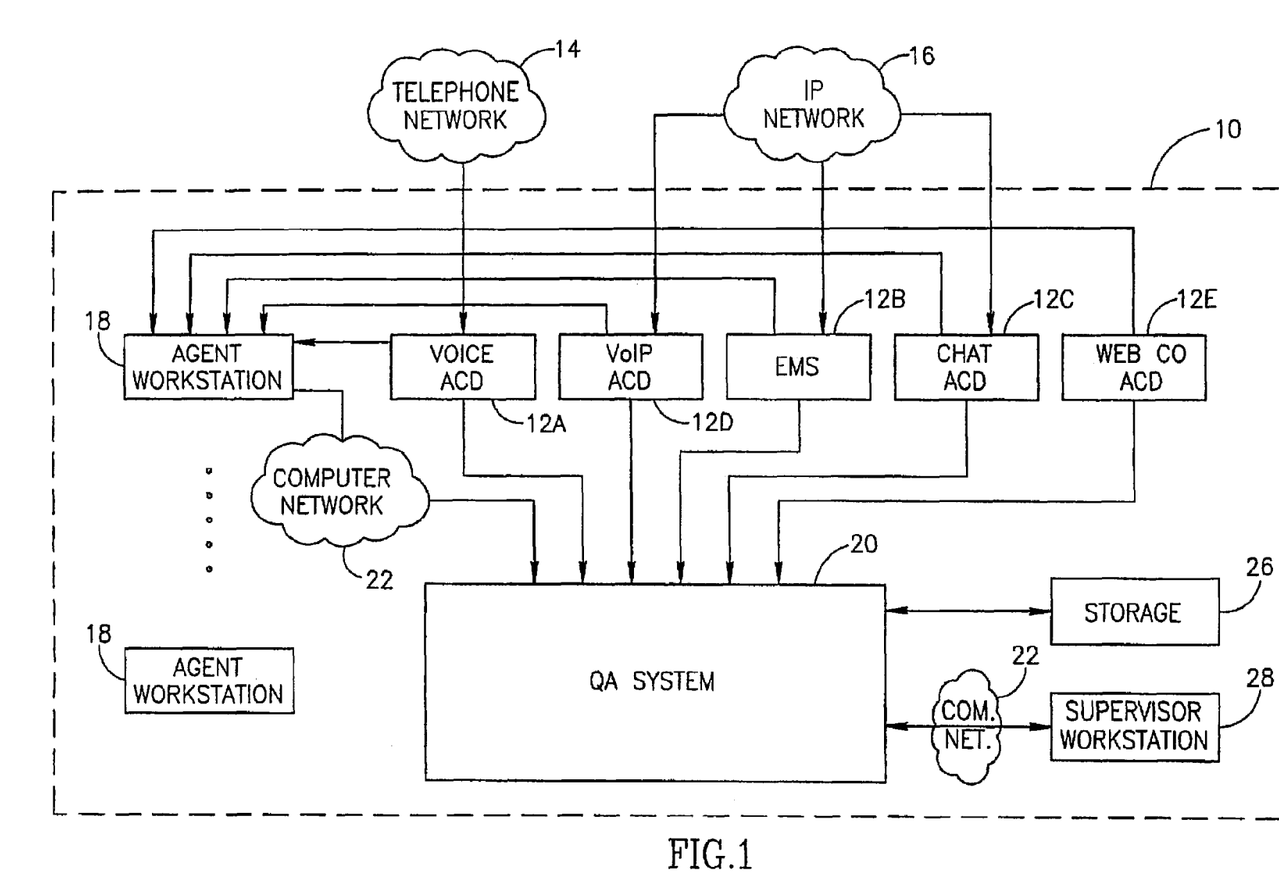
FIG. 1 is a block diagram illustration of a contact center having a multimedia QA system according to some embodiments of the present invention.

Reference is now made to FIG. 1, which is a simplified block diagram illustration of a multimedia contact center 10 having a multimedia QA system 20 according to some embodiments of the present invention. Contact center 10 may comprise a plurality of contact servers 12 coupled to QA system 20 and to either an external telephonic network 14 or an external IP network 16.

An example of a contact server may be a voice automatic call distribution (ACD) server 12A, which is a telephony switch capable of managing the automatic distribution of incoming calls received via network 14. Another example of a contact server may be an e-mail management system (EMS) server 12B, which is capable of managing the automatic distribution of incoming e-mails received via network 16. Additional non-limiting examples of a contact server may be a chat ACD server 12C capable of managing the distribution of chat sessions received via network 16, a voice over Internet protocol (VoIP) ACD server 12D capable of managing the automatic distribution of incoming calls received via IP network 16 and a web collaboration ACD server 12E capable of managing the distribution of web collaboration sessions.

Contact center 10 may further comprise a plurality of multimedia agent-workstations 18, each coupled to QA system 20 and to contact servers 12. The term multimedia agent-workstation refers to a workstation capable of handling at least one of the following: a telephone call received from voice ACD 12A, a VoIP call received from VoIP ACD 12D, e-mail received from EMS 12B, a chat received from chat ACD 12C, and a web collaboration session received from web collaboration ACD 12E.

Additionally, contact center 10 may include a digital storage apparatus 26 having one or more storage media and adapted to store digitally formatted video and audio input. Storage apparatus 26 may receive the video and audio data from QA system 20. Non-limiting examples of storage media may be a hard disk, a digital audio tape (DAT) and an advanced intelligent tape (AIT).

Contact center 10 may also include at least one supervisor workstation 28. Supervisor workstation 28 may be coupled to QA system 20, either by direct connection or via a computer network 22, such as a local area network (LAN). Each workstation may typically comprise a computer, a display, speakers, a keyboard and a printer (not shown), and may serve as a reporting and input retrieval apparatus. QA system 20 may be adapted to provide audio and video data to supervisor workstations 28 either in real-time or in a playback mode where audio, screen data, and other data may be monitored separately or simultaneously.

Figure 2:
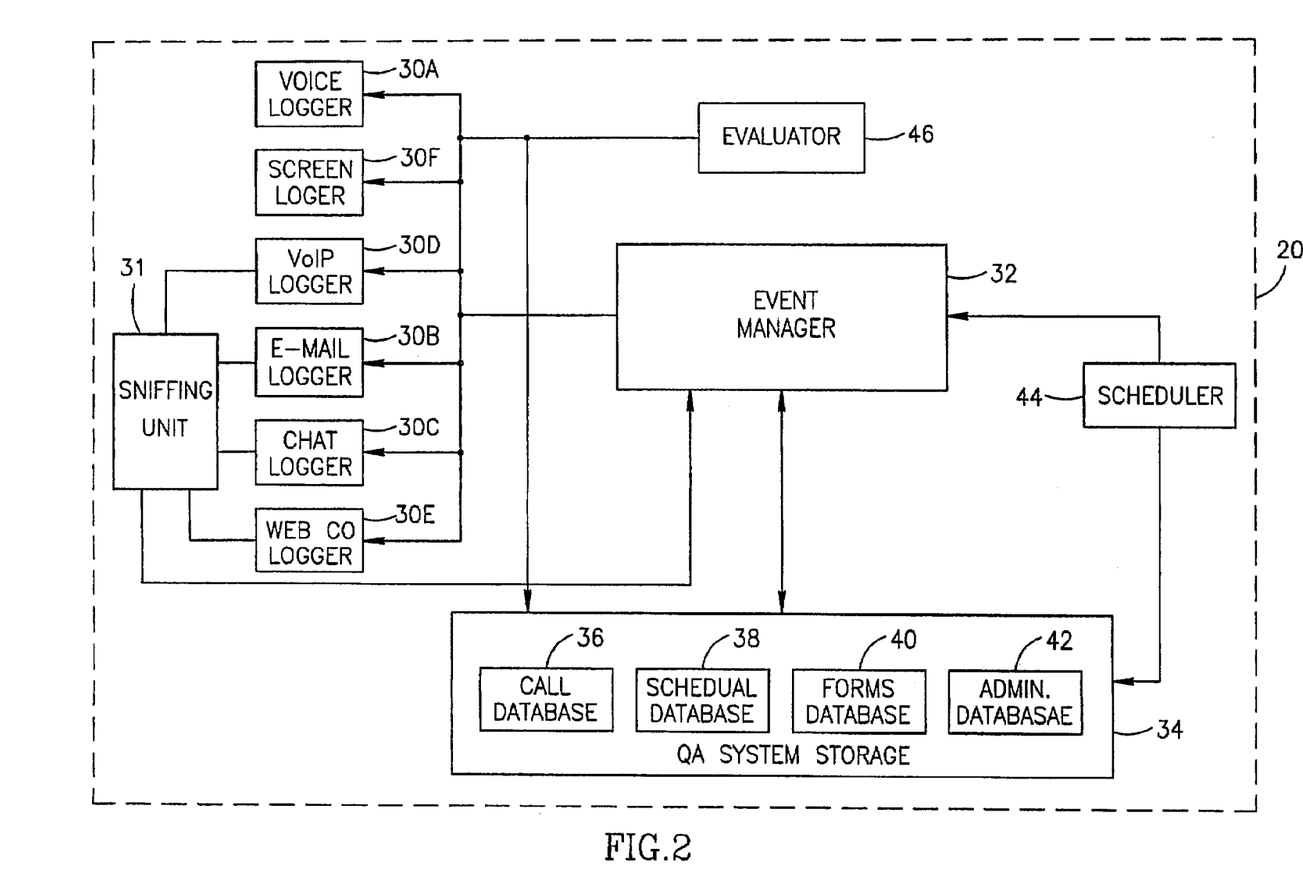
FIG. 2 is a block diagram illustration of the multimedia QA system of FIG. 1 according to some embodiments of the present invention.

Reference is additionally made to FIG. 2, which is a simplified block diagram illustration of multimedia quality-assurance system 20 of FIG. 1, according to some embodiments of the present invention. Some of the components of system 20 have been previously described, in connection to a telephone call quality assurance system, in U.S. patent application Ser. No. 09/503,479, filed Feb. 14, 2000, now U.S. Pat. No. 6,542,602 issued on Apr. 1, 2003, which is incorporated herein by reference in its entirety.

QA system 20 may comprise a plurality of various recording servers 30 adapted to receive audio or video data and to record the data. Non-limiting examples of recording servers may include a voice logger 30A adapted to receive and record telephone call audio from voice ACD 12A and a VoIP logger 30D adapted to receive and record digital audio of VoIP call from VoIP ACD 12D.

Additional examples of recording servers include e-mail logger 30B adapted to receive an e-mail session from e-mail ACD 12B and to store it, chat logger 30C and web collaboration logger 30E. System 20 may further comprise a screen logger 30F adapted to receive video screen data from workstations 18 and to record the captured screen data.

It should be noted that at least one of recording servers 30 might be integrated in another recording server. For example, e-mail logger 30B and chat logger 30C may be integrated in screen logger 30F. Alternatively, all recording servers 30 may be integrated.

QA system 20 may further comprise a sniffing unit 31 coupled to VoIP logger 30D, to e-mail logger 30B and chat logger 30C and to web collaboration logger 30E. Sniffng unit 31 is adapted to intercept VoIP, e-mails and chats by tapping computer network 22 and to determine which data packets have been transferred between a specific agent and a third party.

QA system 20 may further comprise an event manager 32 coupled to recording servers 30 and a QA system storage 34 coupled to event manager 32. Storage 34 may comprise a call database 36, a schedule database 38, a forms database 40, and an administration database 42. Event manager 32 may be adapted to receive a CTI datum associated with an interaction between an agent and a party from any of contact servers 12 and to determine whether the interaction is to be recorded.

For example, event manager 32 may be adapted to receive a notification from voice ACD 12A of a telephone call that has been routed to workstation 18 and may log information regarding the call in call database 36. Event manager 32 may then command voice logger 30A and screen logger 30F to begin recording audio and screen data of a telephone call for which an event notification has been received.

In another example, event manager 32 may be adapted to receive notification from EMS 12B of e-mail that have been routed to workstation 18 and may log the information regarding the call in call database 36. Event manager 32 may then command e-mail logger 30B and screen logger 30F to begin recording the text and screen data of e-mail for which an event notification has been received. In a similar manner, in case of chat sessions, VoIP calls and web collaboration, event manger may receive a notification from the suitable contact server 12 and may log the information in call database 36.

Event manger 32 may be further adapted to receive screen data captured from a display (not shown) of workstation 18 before, during or after a call is received at workstation 18, using conventional screen data capture means. The term "call" refers to any of telephone call, e-mail, VoIP call, chat and web collaboration.

Event manager 32 may provide audio and screen data associated with a particular call as soon as it is switched to supervisor workstation 28 for real-time monitoring. Alternatively, event manager 32 may receive playback requests from supervisor workstations 28, in response to which event manager 32 may retrieve the requested audio and/or screen data from storage apparatus 26 and may provide the data to supervisor workstation 28. Event manager may further comprise a scheduler 44 coupled to event manager 32 and to QA system storage 34 and an evaluator 46 coupled to recording servers 30 and to storage 34.

Evaluator 46 may enable an operator to produce complex evaluating reports, which may improve the ability to evaluate a specific agent in relation to a specific contact and in general. For example, QA system 20 may enable to produce a report that integrates the results of customer surveys and supervisor evaluation reports and enables to compare the evaluation of the customer and the supervisor regarding the quality of an agent.

Non-limiting examples of data fields stored in QA system 20 for producing evaluation reports include a customer response regarding a specific ticket, a customer response regarding a specific agent and a customer response regarding the quality of service for a given product. Additional non-limiting examples include general customer response, customer response after a product purchase and customer response after delivery of product.

Another example of an integrated report may be a market-averages report for a specific market segment. Processing customer responses directing to various companies relating to that market segment may produce a market-averages report.

QA system 20 may be coupled to a customer relationship management (CRM) system (not shown) in synchronization. An application, which may be installed in the CRM system, may provide on-line playback capabilities to an existing CRM system such as SIEBEL Call Center applications of Siebel Systems Inc. of San Mateo, Calif., USA, thus making an enhanced CRM. The integration between QA system 20 and the enhanced CRM system may enable an operator to retrieve all contacts made in the past with a specific customer and replay the contacts (e.g. voice, chat e-mail and VoIP) recording while conducting a present interaction with that customer. System 20 may also provide an operator handling the enhanced CRM system more information regarding the contacts with the customer. Non-limiting examples of such information may include the score given by the supervisor to the agent handling the contact, the relative service level of a contact, the service level of a specific contact relative to the average score of the agent and the like.

Figure 3:
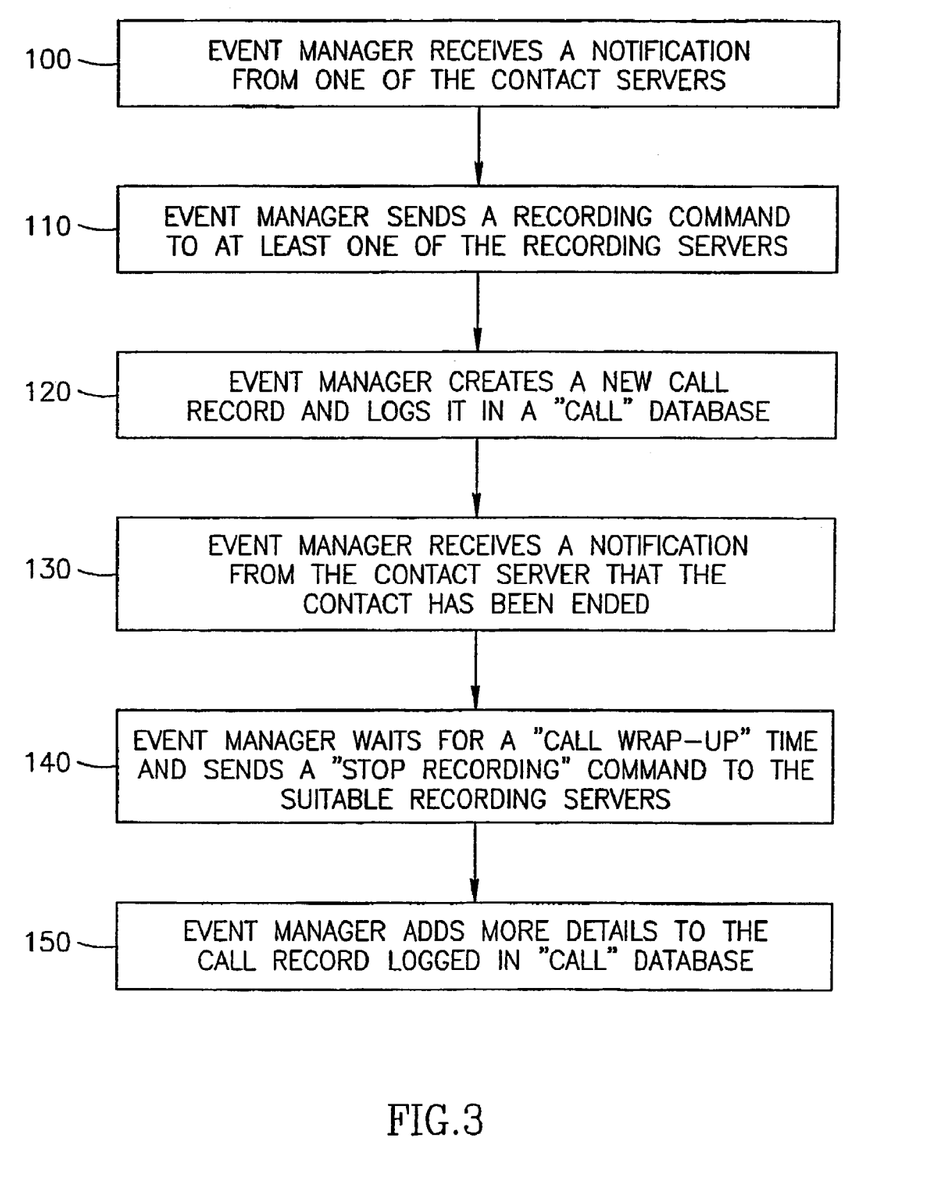
FIG. 3 is a flow chart diagram of the operation of the multimedia QA system of FIG. 2 according to some embodiments of the present invention.

Reference is now made to FIG. 3, which is a flow chart diagram of the operation of QA system 20, during real time events, according to some embodiments of the present invention. QA 20 may receive notification of a real time event from any of contact servers 12 directly or via CTI links.

Scheduler 44 may provide event manager 32 scheduling information stored in schedule database 38. When scheduler 44 notifies event manager 32 that a specific agent contact has to be recorded, system 20 may wait for a real time event notification indicating that such a specific contact is about to occur.

When a notification from the contact server handling the routing of the contact to the agent is received (step 100), event manger 32 may send a recording command to at least one of the recording servers 30 (step 110).

Event manager 32 may create a new call record and may log it in "call" database 36 (step 120). The call record may include the calling party's telephone number, the specific ticket of the incoming e-mail, the calling party IP address, the locations of the interaction recordings in storage 26, the time the interaction took place, and the duration of the interaction.

When the contact between the agent and the third party is over, event manager 32 may receive notification from the suitable contact server 12 indicating that the contact has ended (step 130). Event manager 32, then, may wait for a "call wrap-up" time and may send a "stop recording" command to the recording servers 12 (step 140). The call wrap-up time is a predefined time interval having values of several seconds to several minutes. The purpose of adding the call wrap-up time may be for example to continue recording the agent interaction with the computer after the call is ended. The call wrap-up time may have different values for different types of contacts. Event manager 32 may add additional data to the call record logged in "call" database 36, such as the time the contact has been ended, the duration of the contact and the like (step 150).

Figure 4:
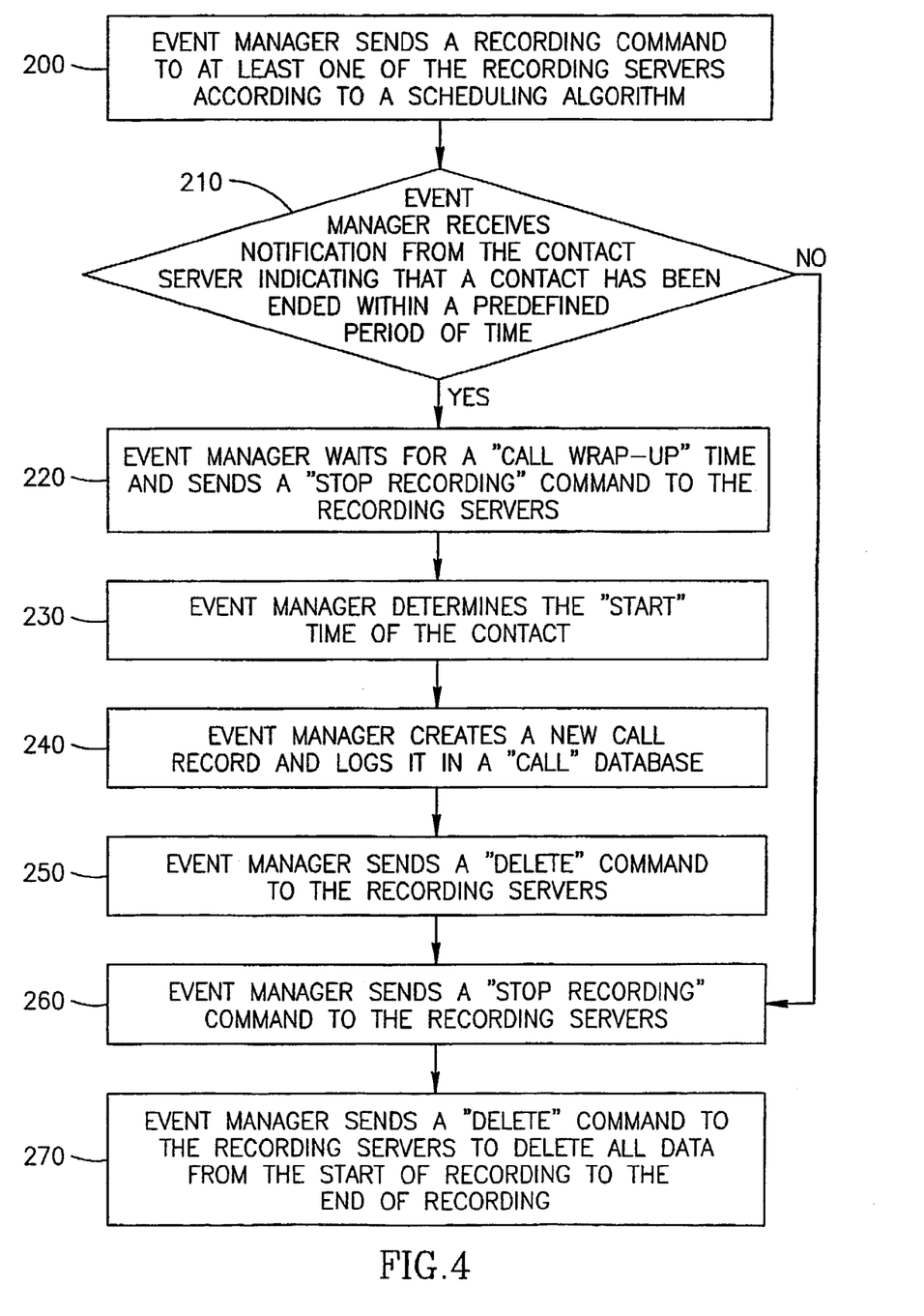
FIG. 4 is a flow chart diagram of the operation of the multimedia QA system of FIG. 2 according to some embodiments of the present invention.

Reference is now made to FIG. 4, which is a flow chart diagram of the operation of QA system 20, during non-real time events, according to some embodiments of the present invention. The embodiments described in FIG. 4 are directed, for example, to a quality assurance method based on call detail record (CDR). The CDR reports are being sent from the contact server after an event has been ended. In these embodiments, system 20 may record specific agents according to a scheduling algorithm stored in schedule database 36.

When scheduler 44 notifies event manager 32 that a specific agent contact has to be recorded, event manager 32 may send a recording command to at least one of the recording servers (step 200). During recording, event manager may wait for a predefined time interval for a notification from the suitable contact server 12 indicating that a contact handled by the specific agent has been ended (step 210). If such a message is received before the predefined time interval, then event manager 32 may wait for a "call wrap-up" time and may send a "stop recording" command to at least one of the recording servers 30 (step 220). The time of ending the contact is received directly with the message, however, the actual time of starting the contact may be determined by event manager 32 from the message sent at the end of the contact (step 230). Event manager, then, may create a new call record and may log it in "call" database 36, specifying the start and end time of the contact (step 240).

Event manager 32 may then send a deletion command to the recording server in order to delete unwanted recorded data. The unnecessary recorded data, in these embodiments, may be data recorded between the recording "start" time and the time that the contact actually started (step 250). The data that may remain stored in recording servers 30 and/or provided to storage 26 is the recorded data of the contact.

As described previously, during recording, event manager may wait for a predefined time interval for a notification from the suitable contact server 12 indicating that a contact handled by the specific agent has been ended (step 210). If such a message is not received before the predefined time interval, then event manager 32 may send a "stop recording" command to the suitable recording server 30 (step 260). Next, event manager 32 may send the recording server 30 a "delete" command indicating that all the recorded data between the start time of the specific recording session and the stop time of that recording session is to be deleted (step 270).

Figure 5:
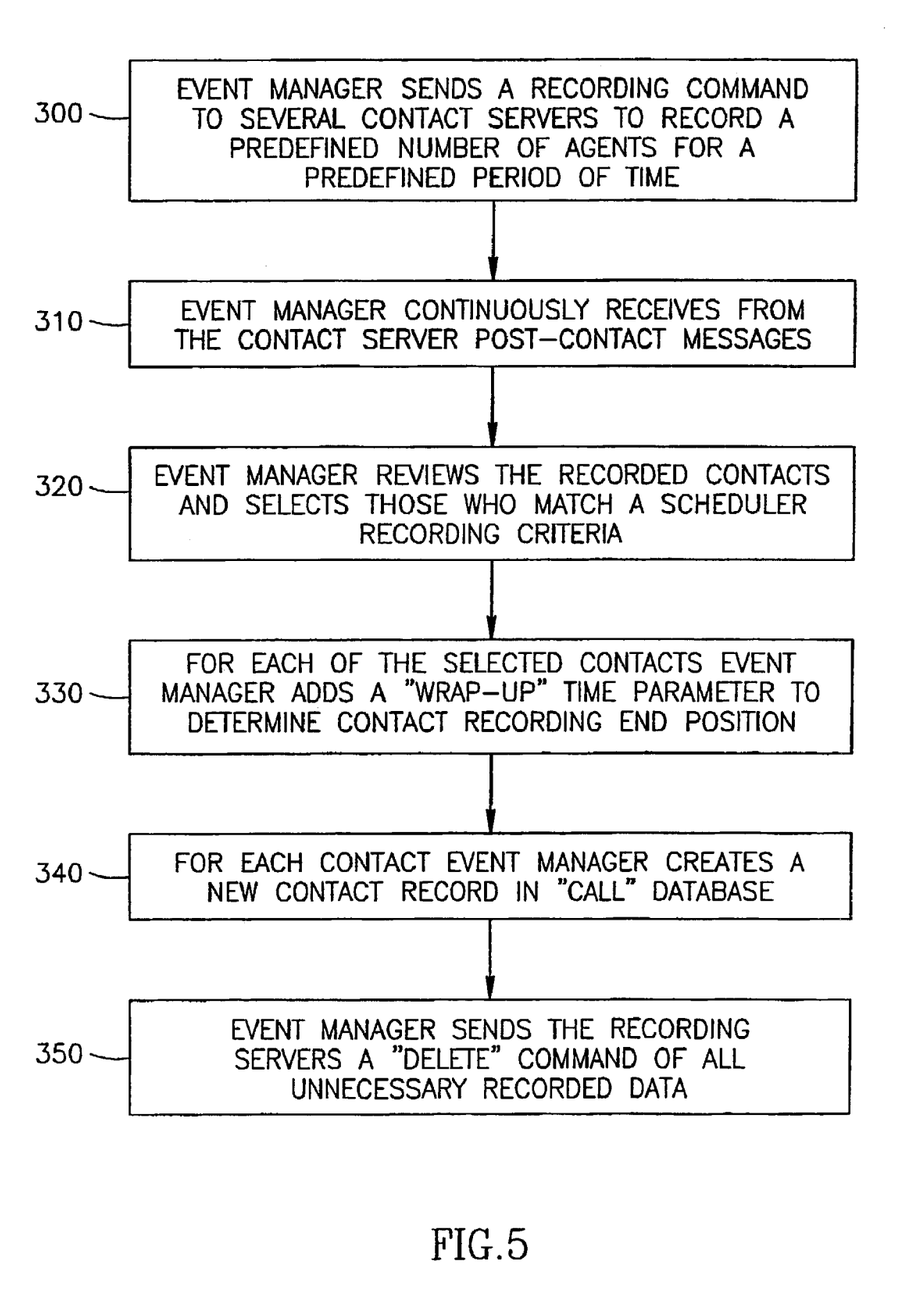
FIG. 5 is a flow chart diagram of the operation of the multimedia QA system of FIG. 2 according to some embodiments of the present invention.

Reference is now made to FIG. 5, which is a flow chart diagram of the operation of QA system 20 using total wiring according to some embodiments of the present invention. In these embodiments, event manager 32 may command the recording servers 30 to record all the contacts between a predefined number of agents and a third party for a predefined period of time (step 300). Once the post-contact messages are received from the various contact servers 12, event manager 32 may determine the start time and stop time of the contact and may command recording server 30 to delete unnecessary recorded data.

Event manager 32 may continuously receive from contact servers 12 post-contact messages such as CDR (step 310). At predefined time (e.g. once a day), event manager 32 may review all the recorded data and may select the contacts that match a scheduler recording criteria (step 320). For each of the selected contacts, event manager 32 may add a "call wrap-up" time parameter to the actual time the contact has been ended (step 330). Next, for each contact, event manager 32 may create a new contact record in "call" database 36 (step 340). Then, event manager 32 may send all the recording servers 30 a "delete" command of all the unnecessary recorded data (step 350).

Figure 6:
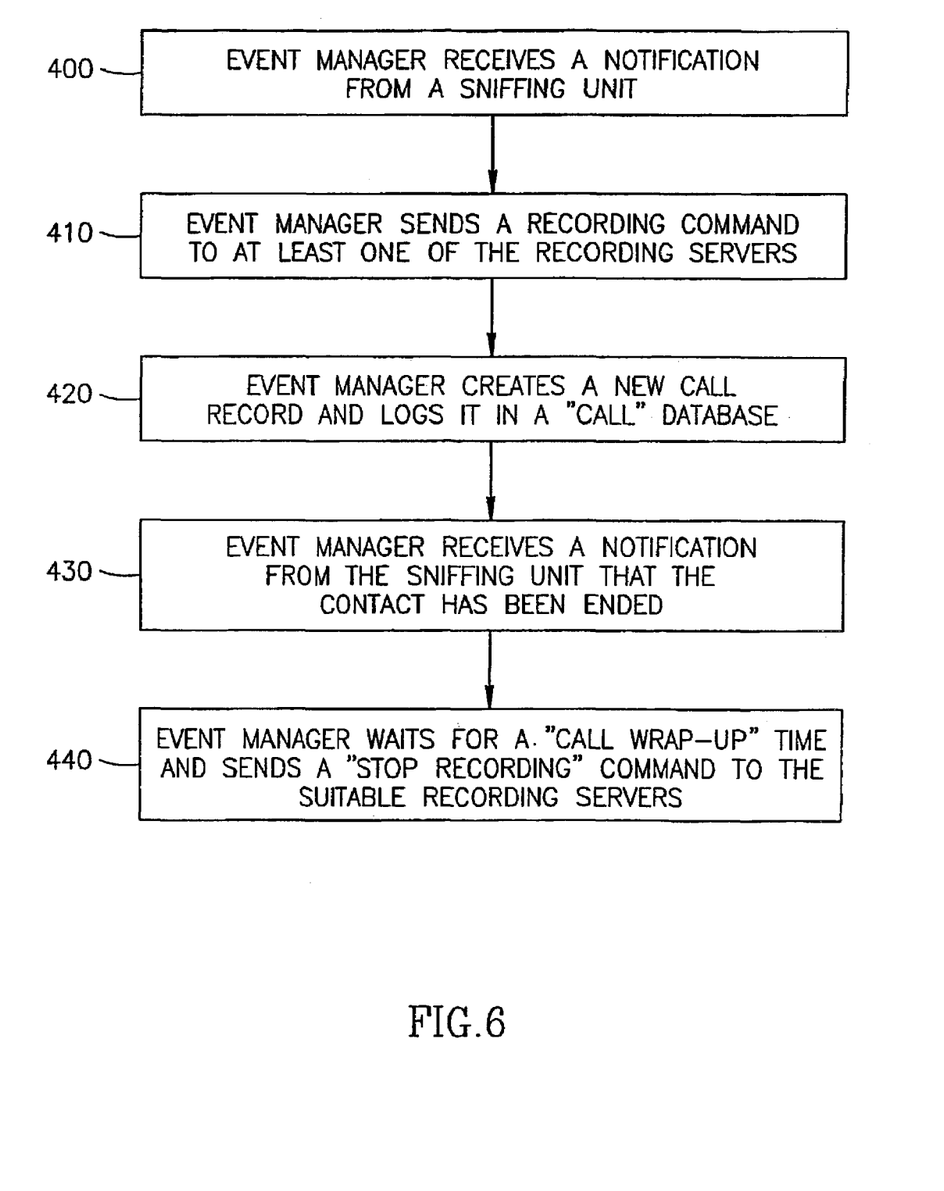
FIG. 6 is a flow chart diagram of the operation of the multimedia QA system of FIG. 2 according to some embodiments of the present invention.

Reference is now made to FIG. 6, which is a flow chart diagram of the operation of QA system 20, according to some embodiments of the present invention.

In these embodiments, event manager 32 may receive a real-time event notification of specific contacts from sniffing unit 31. Sniffing unit 31 is adapted to intercept VoIP, e-mails and chats by tapping computer network 22 and to determine which data packets have been transferred between a specific agent and a third party.

When scheduler 44 notifies event manager 32 that a specific agent contact has to be recorded, system 20 may wait for a real time event notification indicating that such a specific contact is about to occur. When a notification from sniffing unit 31 is received (step 400), event manager 46 may send a recording command to at least one of the recording servers (step 410). Alternatively that notification may be received via a CTI link.

Event manager may create a new call record in "call" database 36 (step 420). The call record may include all the details of the contact that are provided by sniffing unit 31, including the start time. The end time of the contact may be added to the call record when the contact ends.

When the contact between the agent and the third party is over, event manager may receive notification from sniffing unit 31 or the CTI link indicating that the contact has been ended (step 430). Event manager, then, may wait for a "call wrap-up" time and may send a "stop recording" command to the recording servers 12 (step 440).

Figure 7:
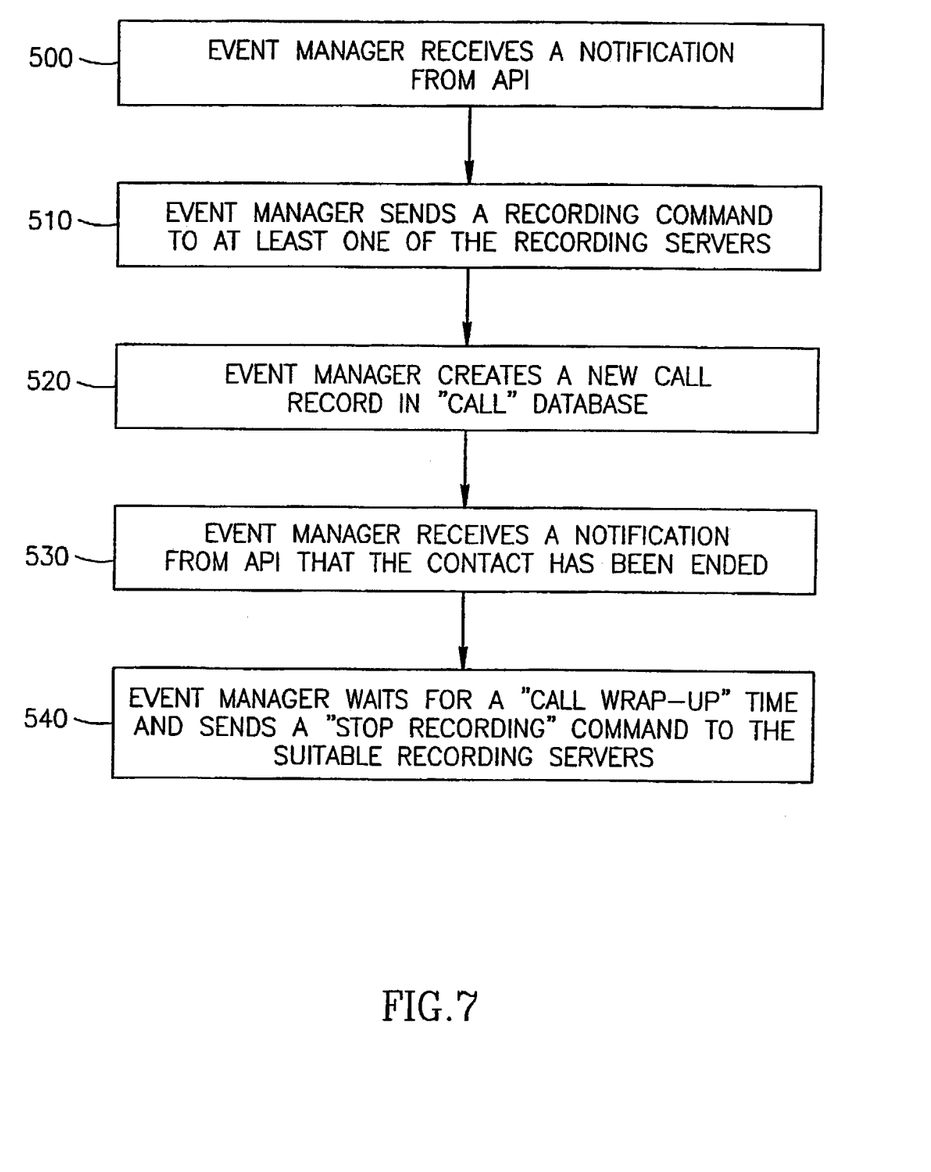
FIG. 7 is a flow chart diagram of the operation of the multimedia QA system of FIG. 2 according to some embodiments of the present invention.

Reference is now made to FIG. 7, which is a flow chart diagram of the operation of QA system 20 using API according to some embodiments of the present invention. According to some embodiments of the present invention, event manager 32 may receive a real time event notification of specific contacts from an application program interface (API) such as an e-mail application interface and a CTI application interface.

When a notification from the API is received (step 500), event manager 32 may send a recording command to at least one of recording servers 12 (step 510). The message received from the API may include information about the type of the contact and the specific agent handling the contact.

Event manager may create a new call record in "call" database 36 (step 520). The call record may include all the details of the contact that are provided by the API, including the start time and the end time of the contact When the contact between the agent and the third party is over, event manager 32 may receive notification from the API indicating that the contact has been ended (step 530). Event manager, then, may wait for a "call wrap-up time" and may send a "stop recording command to the recording servers 12 (step 540).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A multimedia quality monitoring system comprising:
   an event manager coupled to a telephony contact server and one or more computer-communication contact servers, said event manager is to receive a notification that an audio communication has been routed to an agent by said telephony contact server and to determine whether or whether not to record audio data associated with said audio communication and further to receive another notification that a digital communication has been routed to said agent or to another agent by one of said computer-communication contact servers and to determine whether or whether not to record digital data associated with said digital communication, wherein said digital communication is digital audio communication or data communication;
   an audio recording server to receive instructions from said event manager to record said audio data if so determined by the event manager; and
   at least one computer-data recording server to receive instructions from said event manager to record said digital data if so determined by the event manager.

2. The monitoring system of claim 1, wherein said computer-communication contact server is selected from the group including a voice over Internet protocol automatic call distribution server, a chat automatic call distribution server, a web collaboration automatic call distribution server and an e-mail management system server.

3. The monitoring system of claim 1 further comprising a screen recording server adapted to record at least a portion of an interaction of said agent with a computer at least during said audio or digital communication.

4. The monitoring system of claim 1, wherein said notification is received via a computer telephony integration server.

5. The monitoring system of claim 1 further comprises a scheduler coupled to said event manager, said scheduler provides said event manager scheduling information.

6. The monitoring system of claim 1 further comprises a sniffing unit coupled to said event manager and to said at least one computer-data recording server, and wherein said notification is received from said sniffing unit.

7. The monitoring system of claim 1, wherein said notification is received from an application program interface.

8. The monitoring system of claim 1 further comprises an evaluator adapted to provide a report relating to any of said data.

9. The monitoring system of claim 1, wherein said monitoring system is coupled to a customer relationship management system and is adapted to provide said customer relationship management system with an ability to retrieve playback of said digital data associated with said communication in real-time.

10. A method for use in a multimedia quality monitoring system, the method comprising:
    receiving by an event manager a notification that a digital communication has been routed by a computer-communication contact server to an agent;
    determining whether or whether not to instruct a computer-data recording server to record digital data associated with said digital communication;
    receiving by said event manager a notification that an audio communication has been routed by a telephony contact server to said agent or to another agent; and
    determining whether or whether not to instruct an audio recording server to record audio data associated with said audio communication.

11. The method of claim 10 wherein receiving the notification associated with the digital communication routed by said computer-communication contact server comprises receiving the notification by a voice over Internet protocol automatic call distribution server, a chat automatic call distribution server, a web collaboration automatic call distribution server and an e-mail management system server.

12. The method of claim 10 further comprising:
    recording at least a portion of an interaction of said agent with a computer during said communication while recording generally synchronously data associated with said audio or digital communication.

13. A multimedia quality monitoring system comprising:
    an event manager coupled to a Voice-over Internet protocol (VoIP) contact server, said event manager is able to receive a notification that a communication has been routed by said VoIP contact server to an agent and to determine whether or whether not to record VoIP data associated with said communication;
    a VoIP recording server to receive instructions from said event manager to record said VoIP data if so determined by the event manager; and
    at least one computer-data recording server to receive instructions from said event manager to record non-audio digital data associated with non-audio digital communication.

14. The monitoring system of claim 13, wherein said non-audio digital communication is selected from the group including an e-mail session, a chat session and a web collaboration session.

15. The monitoring system of claim 13 further comprising:
    a screen recording server adapted to record at least a portion of an interaction of said agent with a computer at least during said communication.

* * * * *